(12) United States Patent
Bowen et al.

(10) Patent No.: US 7,806,318 B1
(45) Date of Patent: Oct. 5, 2010

(54) CARD ACTIVATED CASH DISPENSING AUTOMATED BANKING MACHINE AUDIBLE USER INTERFACE SYSTEM AND METHOD

(75) Inventors: Bruce Bowen, Chepachet, RI (US); Lee Kravitz, Ellicott City, MD (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 24 days.

(21) Appl. No.: 12/380,106

(22) Filed: Feb. 23, 2009

Related U.S. Application Data

(63) Continuation of application No. 11/169,295, filed on Jun. 28, 2005, now Pat. No. 7,494,050.

(60) Provisional application No. 60/584,756, filed on Jun. 29, 2004.

(51) Int. Cl.
*G06Q 40/00* (2006.01)

(52) U.S. Cl. .............................. 235/379; 705/43; 705/44; 705/45

(58) Field of Classification Search ................. 235/379; 705/43–45
See application file for complete search history.

(56) References Cited

U.S. PATENT DOCUMENTS

| | | | |
|---|---|---|---|
| 4,760,245 A | | 7/1988 | Fukaya |
| 5,185,515 A | | 2/1993 | Nishibe |
| 5,412,189 A | | 5/1995 | Cragun |
| 5,984,178 A | * | 11/1999 | Gill et al. ..................... 235/379 |
| 6,045,039 A | * | 4/2000 | Stinson et al. ............... 235/379 |
| 6,049,328 A | | 4/2000 | Venderheiden |
| 6,061,666 A | | 5/2000 | Do et al. |
| 6,109,522 A | * | 8/2000 | Force et al. ................. 235/379 |
| 6,112,983 A | * | 9/2000 | D'Anniballe et al. ....... 235/379 |
| 6,149,056 A | * | 11/2000 | Stinson et al. ............... 235/379 |
| 6,464,135 B1 | * | 10/2002 | Cohen et al. ................. 235/379 |
| 6,474,547 B1 | | 11/2002 | Suzuki |
| 6,478,221 B1 | | 11/2002 | Sommerville |
| 6,527,171 B1 | * | 3/2003 | Brooks et al. ............... 235/379 |
| 6,539,361 B1 | | 3/2003 | Richards |
| 6,695,204 B1 | * | 2/2004 | Stinson et al. ............... 235/379 |
| 7,077,312 B2 | | 7/2006 | Putman |
| 7,118,031 B2 | | 10/2006 | Ramachandran et al. |
| 7,146,577 B2 | | 12/2006 | Hoffman |
| 7,175,076 B1 | | 2/2007 | Block et al. |
| 7,194,414 B1 | | 3/2007 | Savage et al. |
| 7,577,612 B2 | * | 8/2009 | Waller et al. ................... 705/43 |

(Continued)

*Primary Examiner*—Thien Minh Le
*Assistant Examiner*—Tuyen K Vo
(74) *Attorney, Agent, or Firm*—Christopher L. Parmelee; Ralph E. Jocke; Walker & Jocke

(57) ABSTRACT

An automated banking machine operates to carry out financial transfers responsive to data read form data bearing records. The machine includes a card reader that operates to read data from user cards. The card data corresponds to financial accounts. The automated banking machine further includes a cash dispenser. The machine is operative to dispense cash to an authorized user based on identifying data including card data, and to cause a financial transfer from an account corresponding to card data through communication with at least one remote computer. The machine is operative to receive a screen message from a host banking system. The screen message may include data indicating the presence of speech data in the screen message.

11 Claims, 9 Drawing Sheets

U.S. PATENT DOCUMENTS

| | | | |
|---|---|---|---|
| 2001/0051922 A1* | 12/2001 | Waller et al. | 705/43 |
| 2002/0073032 A1* | 6/2002 | Holmes et al. | 705/43 |
| 2003/0037125 A1 | 2/2003 | Luman | |
| 2003/0066876 A1* | 4/2003 | Goldman et al. | 235/379 |
| 2006/0038004 A1* | 2/2006 | Rielly et al. | 235/379 |
| 2007/0215686 A1 | 9/2007 | Matson et al. | |

* cited by examiner

CARD ACTIVATED CASH DISPENSING AUTOMATED BANKING MACHINE AUDIBLE USER INTERFACE SYSTEM AND METHOD

CROSS REFERENCE TO RELATED APPLICATIONS

This application is a continuation of copending U.S. application Ser. No. 11/169,295 filed Jun. 28, 2005, which claims benefit of U.S. Provisional Application Ser. No. 60/584,756 filed Jun. 29, 2004, pursuant to 35 U.S.C. §119 (e), the disclosures of which are hereby incorporated herein by reference.

TECHNICAL FIELD

This invention relates to automated banking machines that operate responsive to data read from user cards and which may be classified in U.S. Class 235, Subclass 379.

BACKGROUND ART

Automated banking machines are well known. A common type of automated banking machine used by consumers is an automated teller machine. automated teller machine enable customers to carry out banking transactions. Common banking transactions that may be carried out with automated teller machines include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers' checks. For purposes of this disclosure, references to an automated teller machine, an automated banking machine or automated transaction machine shall encompass any device which carries out transactions including transfers of value.

Automated teller machines generally include a display device which is operative to output a visual user interface. The user interface includes instructions and selectable options which visually guide a user through the operation of the machine. For example, automated teller machines often include a hierarchical menu for navigating through a plurality of different user interface screens. Such menus often list various types of transaction functions which may be performed at the automated teller machine such as a withdrawal of cash or the deposit of a check. Although a consumer with normal vision can readily operate such an automated teller machine by following the commands visually presented through the display device, a consumer who is visually impaired may not be able operate such an automated teller machine as easily. As a result, there exists a need for an automated teller machine which is capable of being operated by consumers with either normal or impaired vision.

OBJECTS OF EXEMPLARY EMBODIMENTS

It is an object of an exemplary form of at least one embodiment to provide an automated banking machine at which a user may conduct transactions.

It is a further object of an exemplary form of at least one embodiment to provide an automated banking machine that may be operated by consumers with normal vision.

It is a further object of an exemplary form of at least one embodiment to provide an automated banking machine that may be operated by consumers with impaired vision.

Further objects of exemplary embodiments will be made apparent in the following Detailed Descriptions of Exemplary Embodiments and the appended claims.

The foregoing objects are accomplished in an exemplary embodiment of the invention by an automated banking machine that includes output devices such as a display screen, and input devices such as a touch screen, a keyboard, card reader or other type input device. The banking machine may further include devices such as a cash dispenser mechanism for sheets of currency, a printer mechanism, a depository mechanism and other transaction function devices that are used by the machine in carrying out banking transactions.

The banking machine is in operative connection with at least one computer. The computer is in operative connection with the output devices and the input devices, as well as with the cash dispenser mechanism, and other physical transaction function devices in the banking machine. The computer includes software programs that are executable therein. The software may include terminal control software which is operative to cause the machine to perform a plurality of different transaction functions. In addition, the terminal control software of the exemplary embodiment may be operative to cause the machine to provide a visual and/or an audible user interface for guiding a consumer through the operation of the machine.

In one exemplary embodiment, the terminal control software may be operative to cause the computer to output a visual menu for navigating between different user interface screens. Such screens may include transaction information and selectable options for operating the automated banking machine. For each visual user interface screen, the exemplary embodiment of the terminal control software may be operative to cause the computer to output corresponding audible outputs through external loudspeakers and/or an output device that is connectable to a set of headphones. The audible outputs may include verbal instructions which describe the functions and operations available for the current state of the banking machine. Such audible verbal instructions may further include a description of which keys, buttons, transaction function devices, and other input devices to press, manipulate, or activate in order to perform the available machine functions and operations. In addition, such audible verbal instructions may further include a description of the relative locations of the keys, buttons, transaction function devices, and other input devices for performing the functions and operations. Further, such verbal instructions may include a description of how to use or manipulate the keys, buttons, transaction function devices, and other input devices of the banking machine. For example, to initially activate the automated banking machine, the audible verbal instructions may include a description of the location of a card reader of the machine and indicate in what orientation a card may be inserted and/or swiped in the card reader for purposes of being read. Further audible verbal instructions may describe the types of transaction functions that are available and which keys or other input devices must be pressed or manipulated in order to either select, modify, or cancel each of the transaction functions.

As used herein, the term "verbal" corresponds to spoken human language words generated by either a human voice or machine synthesized human voice emulation. In exemplary embodiments, audible verbal instructions may include a plurality of spoken words produced responsive to digital or analog recordings of either a human voice or computer synthesized voice. In addition, audible verbal instructions may be produced directly from hardware devices and/or software programs operating in the Automated teller machine which are capable of synthesizing human language words, sentences, syllables and other human language communication sounds. Such hardware devices and/or software programs for example may include text to speech synthesizer devices which are operative to generate sound signals or audible outputs which include verbal instructions responsive to alphanumeric text.

The exemplary embodiment may include a plurality of features which enable the machine to be easily and conveniently used by the visually impaired. For example, in the exemplary embodiment, the automated banking machine may enable a consumer to repeat the last audible verbal instructions with the press of a single button and/or key. Also, for each key press or other input, the banking machine may be operative to audibly identify the letter, number, and/or function of the key.

In the exemplary embodiment, the automated banking machine may enable the consumer to cycle through a plurality of volume changes with the press of a single button and/or key.

Further, the banking machine may be operative to automatically mute any external loudspeakers of the banking machine upon the detection of the operative connection of headphones to the machine by a user. In addition, the exemplary embodiment of the banking machine may be operative to set the headphone volume at a pre-determined low level with each new consumer session. The consumer may then press the volume key and/or button to increase the volume level of the headphones to a desirable level.

In exemplary embodiments, the banking machine may further be operative to automatically stop displaying visual information through the display screen of the banking machine responsive to the detection of the operative connection of headphones to the machine by the user. For example, all or portions of the visual information typically displayed through the display screen regarding the operation of the machine and/or transaction information may be hidden from view when headphones are placed in connection with the machine. When the headphones are removed from connection with the machine, the automated banking machine may be operative to automatically display the normal visual information of the machine for its current state.

The exemplary embodiment may include a new audio system which enables the automated banking machine to have one or more of the previously described audible features. The new audio system may be operative to accept and adjustably mix together inputs from a plurality of audio sources, including multimedia inputs such as MP3 streams, voice inputs such as from WAV files, and system keyboard and/or prompting beeps. An exemplary embodiment of the audio system may further include both external and headphone connection ports which are operative to individually and selectively amplify and output the mixed signals through external loudspeakers and headphones placed in operative connection with connection ports.

The audio system may be operative to detect the connection of a headphone to the headphone port, automatically mute the output to the external port which is connected with external speakers, and set the headphone volume at a minimum level. In addition, the exemplary audio system may be operative to detect the removal of the headphone from connection with the headphone port, and automatically reinstitute the output through the external port.

In the exemplary embodiment, the new audio system may further be operative to selectively step through a plurality of headphone volume levels responsive to one or more volume changing inputs. Such inputs may be directly received from a key or button in operative connection with the new audio system. In alternative exemplary embodiments of the audio system, signals corresponding to a volume change may be received from one or more buttons of the banking machine.

DETAILED DESCRIPTIONS OF EXEMPLARY EMBODIMENTS

Figure 1:
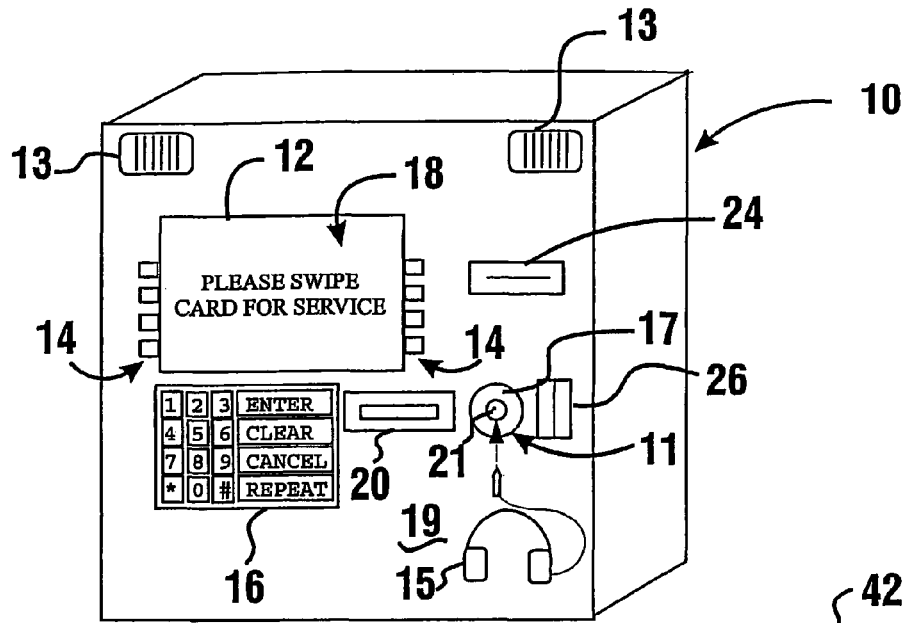
FIG. 1 is a perspective view representative of an exemplary embodiment of an Automated teller machine incorporating features of the present invention.

Referring now to the drawings and particularly to FIG. 1, there is shown therein a perspective view of an exemplary automated banking machine such as an automated teller machine (ATM) 10 including certain features of the present invention. The exemplary embodiment of the ATM 10 includes output devices such as a display device 12 and external loudspeakers 13. The display device 12 is operative to provide a consumer with a user interface 18 that includes a plurality of screens or other outputs including selectable options for operating the machine. The external loudspeakers 13 may be operative to provide a consumer with audible music, beeps, signals, and/or verbal instructions for operating the machine.

The exemplary embodiment of the ATM 10 may further include at least one output device such as an external port 11. In the exemplary embodiment of the ATM 10, the external port 11 includes a speaker port such as a headphone port 21 for operatively connecting portable speaker devices such as a set of headphones 15 to the ATM. In other exemplary embodiments, the external port 11 may comprise a wireless connection port. For example, in an alternative exemplary embodiment of the ATM 10, the external port 11 may include a wireless communication device which is operative to communicate with a wireless headphone set or other external device capable of providing audible, visual or other user perceivable outputs. Such wireless communication devices may communicate with the external device using RF or IR, for example.

In the exemplary embodiment, the external port 11 may include a base 17 with a useful shape that is not flush with the fascia 19 of the ATM 10. The shape of the base 17 may have a distinctive contour which enables a consumer with impaired vision to quickly locate the external port by touching the fascia 19 and base 17 of the ATM. For example, in one exemplary embodiment, the base of the external port may include a concave portion with a female headphone jack or port 21 positioned generally in the center of the concave portion. In further exemplary embodiments, the base 17 of the external jack may extend from the fascia 19 and have a distinctive contour or edge shape such as that of a square, circle, triangle, or other unique shape that is identifiable by touch.

The exemplary embodiment of the ATM 10 may include a plurality of input devices such as function keys 14 and a keypad 16. The exemplary embodiment of the ATM 10 may further include other types of input devices, such as a touch screen, microphone, card reader 26, biometric reader or any other device that is operative to provide the ATM with inputs representative of user instructions or information. The exemplary embodiment of the ATM 10 may further include a plurality of transaction function devices, such as a sheet or cash dispenser 20, receipt printer 24 and other devices.

Figure 2:
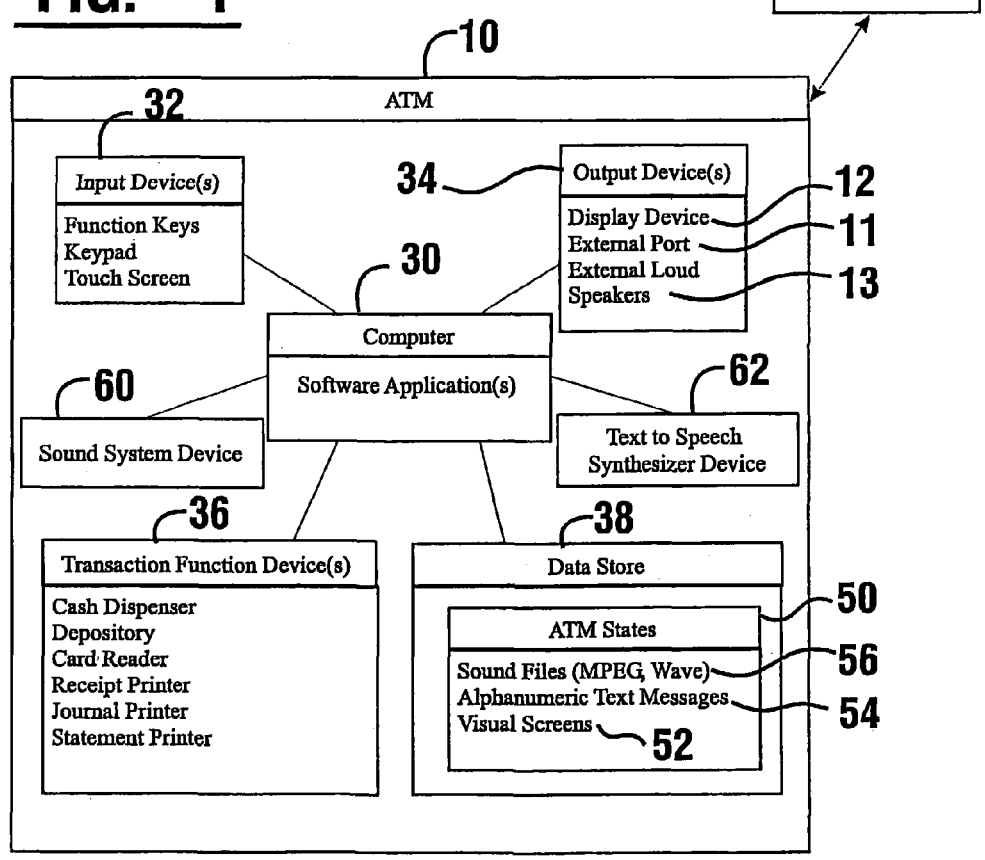
FIG. 2 is a schematic view of the exemplary embodiment of the Automated teller machine.

FIG. 2 shows a schematic view of components which may be included in an exemplary embodiment of the ATM and a system in which it is operated. The ATM 10 may include at least one computer 30. The computer 30 may be in operative connection with the input device(s) 32, the output device(s) 34, the transaction function device(s) 36 and at least one data store 38. The exemplary embodiment further includes one or more software application(s) 40 operative in the computer 30. The software applications may include for example terminal control software, maintenance software, diagnostic software and any other software that enables the ATM to perform transaction functions for users and/or enables authorized representatives of an operator of the ATM to service, configure and maintain the ATM. An exemplary embodiment of an ATM may be operative to communicate with a host banking system 42 to enable a consumer to perform such exemplary transaction functions as withdrawing cash from an account through operation of the cash dispenser device 20, depositing checks or other items with the depository device, performing a balance inquiry for a financial account and transferring value between accounts.

The exemplary embodiment may be operative to provide a consumer with a user interface that may be visually displayed and/or output in audible form for the consumer. The exemplary user interface may guide the consumer through the selection of one or more functions which are to be performed by the ATM. Such functions may include a plurality of different transaction functions such as the dispense of cash, balance inquiries, deposits and transfers. However, such functions may also include options for navigating through the user interface such as functions for canceling or confirming a selection. Functions may also include options for configuring the user interface, such as changing the human language output through the user interface or changing the volume of the audio output of the ATM. In addition, functions may also include options for making the user interface more user friendly, such as functions that repeat an audible instruction, or that provide help or a description for other functions of the ATM.

The exemplary embodiment of the ATM includes at least one software application such as a terminal control software program that at any given time is operative to be in one of a plurality of different states. To perform transaction functions, the terminal control software may progresses between the various states, prompting the user to input different types of information in some states and performing a transaction function in other states in response to the inputted information.

The exemplary embodiment of the ATM may operate to organize different transaction functions into a hierarchy using a plurality of menus and sub-menus (also referred to herein as "screens"). A menu may be visually and/or audibly output to the consumer for each of the different states the ATM is operative to progress through to select and perform the transaction functions. Each menu may be operative to list those functions which may be performed in any given state of the ATM. Selecting an option or function visually listed or verbally described in a menu may cause the ATM to change to a different state which causes a display and/or output of an audible verbal description of a sub-menu of options or functions available to be performed by the ATM in the new state.

The exemplary data store 38 of the ATM may be operative to store therein, information for generating visible outputs and audible outputs that are representative of menus and sub-menus for a plurality of different states 50 of the ATM. Such information, for example may include stored data for producing visible outputs such as visual screen data 52 for operative states of the ATM. Such information may further include stored data for producing audio outputs such as MP3 or WAV sound files 56 which include verbal instructions for operative states of the ATM. Such stored data for producing audio outputs may also include alphanumeric text messages 54 (also referred to herein as "text-to-speech data"), which may be used by the computer 30 to generate audible verbal instructions for operative states of the ATM. In exemplary embodiments, the visual screen data 52 may be accessed by the computer and used to produce visible outputs through the display device 12. Also, the audio output data such as the sound files 56 and/or text messages 54 may be accessed by the computer and used to produce audible outputs with verbal instructions or descriptions through external loudspeakers 13 and/or headphones. In an exemplary embodiment, the ATM may received visual screen data and/or audio output data from a host banking system.

As shown in FIG. 2, the ATM 10 may further include a sound system device 60 in operative connection with the computer. The exemplary sound system device 60 may be operative to produce signals that produce audible outputs. Such signals may be directed to the external port 11 and/or the external loudspeakers 13. In one exemplary embodiment, the sound system device may be operative to selectively mix and amplify a plurality of different audio input signals to generate an amplified audible output signal. Alternative exemplary embodiments of the ATM 10 may further include a text to speech synthesizer device 62 which is operative to convert the text messages 54 into the verbal instructions or descriptions included in the audible outputs of the ATM.

The exemplary embodiment of the ATM 10 may be designed to be used by consumers with normal vision as well as users who have impaired vision or who are blind. For example, a user with normal vision may view the display screen to read instructions for operating the ATM 10. A user with impaired vision may listen to verbal instructions and descriptions output from the external loudspeakers 13. In addition, a user with impaired vision may operatively connect a personal set of headphones 15 or other device with the external port 11 of the ATM to listen to verbal instructions and descriptions in private. As used herein, the phrases "verbal instructions" or "verbal descriptions" are used interchangeably, and may include verbal instructions, commands, descriptions, and/or any other verbal information.

In an exemplary embodiment, the sound system device 60 may be operative to detect the impedance change across the external port 11 when headphones 15 are electrically connected to the external port. When the connection is detected, the sound system device 60 and/or computer 30 may be operative to mute any audible output being directed to the external loudspeakers 13. The computer may then be operative to output private verbal instructions through the headphones which describe to the user how the ATM may be operated. In exemplary embodiments, muting an audible output may include the computer or the sound system device operating to lower the volume level of the audible output through the external speakers to a generally silent level. Muting an audible output may also include stopping the playing or production of audio outputs by the computer or the sound system device.

Upon detection of the connection of the headphones or other external device to the external port, the sound system and/or the computer may be operative to change the volume level of the audible output being directed to the headphones or other device through the external port to a predetermined level. Such a predetermined level may correspond to a relatively low volume level that is not likely to cause discomfort to the majority of consumers using the ATM. In the exemplary embodiment, the sound system may be in operative connection with one or more volume changing switches, keys, dials, buttons or other devices which are accessible to the consumer. After the operative connection of the headphones or other device to the external port, the volume changing devices may be operated by the consumer to increase or decrease the volume level as desired by the consumer. In an exemplary embodiment, the sound system device may further be operative to detect when the headphone has been disconnected with the external port. When this occurs the sound system and/or the computer may be operative to mute the audible output to the external port and institute the audible output through the external loudspeakers.

In alternative exemplary embodiments, a key of a keypad of the ATM may be operative to control the volume of audio outputs. When a designated volume key of the keypad or other key is pressed or actuated, the computer may be operative to cause the ATM to change the current volume level and audibly output a word such as "Volume" at the newly selected volume level. For example, when a consumer presses the volume key of the keypad twice in succession, an exemplary embodiment of the banking machine may be operative to output the word "Volume" twice with the second occurrence of the word "Volume" being louder than the first occurrence. When the volume has reached a maximum level, the next time the volume key of the keypad is pressed, the exemplary embodiment of the ATM may be operative to return the volume level to a predetermined minimum usable volume level and output a word such as "Volume" at the corresponding minimum volume level.

Figure 3:
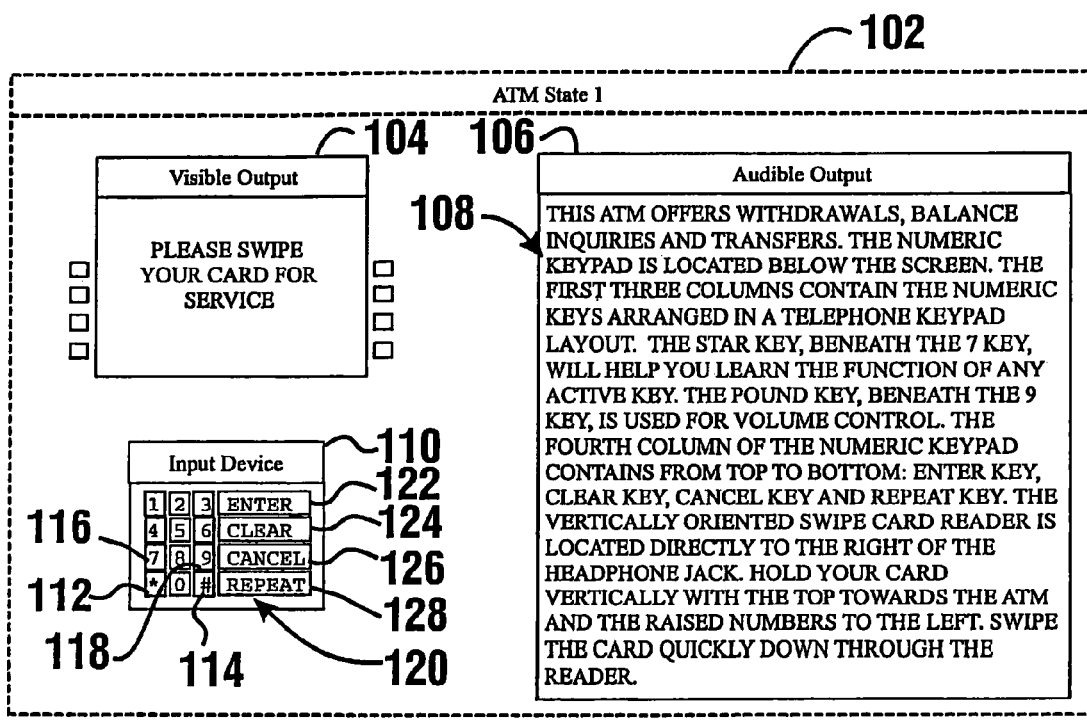
FIGS. 3-13 are schematic views of the exemplary embodiment of the Automated teller machine in a plurality of different states of operation.

FIGS. 3-8 show schematic views of the ATM 10 in a plurality of different states. Such states are examples of one exemplary path a consumer may take through the hierarchy of user interface menus for purposes of operating the ATM 10. FIG. 3 shows the ATM 10 in a first mode or state 102 which may be active when a user first approaches the machine. Here the ATM is operative to attract or invite consumers to use the services of the ATM. The exemplary embodiment of the ATM may include a visible output 104 through a display device of the ATM. The visible output may include indicia such as text which informs the consumer that the card may be swiped for initiating operation of the machine.

For users that are visually impaired, the exemplary embodiment of the ATM may further be operative to output an audible output 106 through external loudspeakers or headphones of the consumer. Such an audible output 106 may include verbal instructions 108 which inform the consumer which types of transaction functions can be performed at the machine. The verbal instructions 108 may also describe the locations of input devices such as a keypad 110 of the ATM and may describe the physical locations and/or configurations of the input devices. In addition, the verbal instructions may describe how the input device may be manipulated to select different functions of the machine and may further describe what the functions perform. Also, the verbal instructions may describe the location of transaction function devices and describe how the transaction function devices may be used.

For example, in the state shown in FIG. 3, the verbal instructions may indicate that the ATM offers transaction functions such as withdrawals, balance inquiries and transfers. In addition the verbal instructions may indicate that the keypad 110 is located below the display device. Further, the verbal instructions may indicate that the keypad is organized similar to a telephone keypad. Also, the verbal instructions may describe the locations of certain keys of the keypad, including their function. For example, the star "*" key 112 may be indicated to be below the seven "7" key 116 and is operative to help the consumer learn the function of any active key. The pound "#" key 114 may be indicated to be below the nine "9" key 118 and is used for volume control. A fourth column 120 of keys in the exemplary keypad may be described as including from top to bottom an enter key 122, a clear key 124, a cancel key 126, and a repeat key 128. In exemplary embodiments, the verbal instructions 108 may further indicate that the swipe card reader is vertically orientated and is located to the right of the headphone jack. In exemplary embodiments, audible outputs may also indicate that the swipe reader is to be used by holding a credit or debit card vertically with the top toward the ATM and with the raised numbers to the left and by swiping the card quickly down through the slot in the reader. Of course these outputs are exemplary and in other embodiments other approaches may be used.

Figure 4:
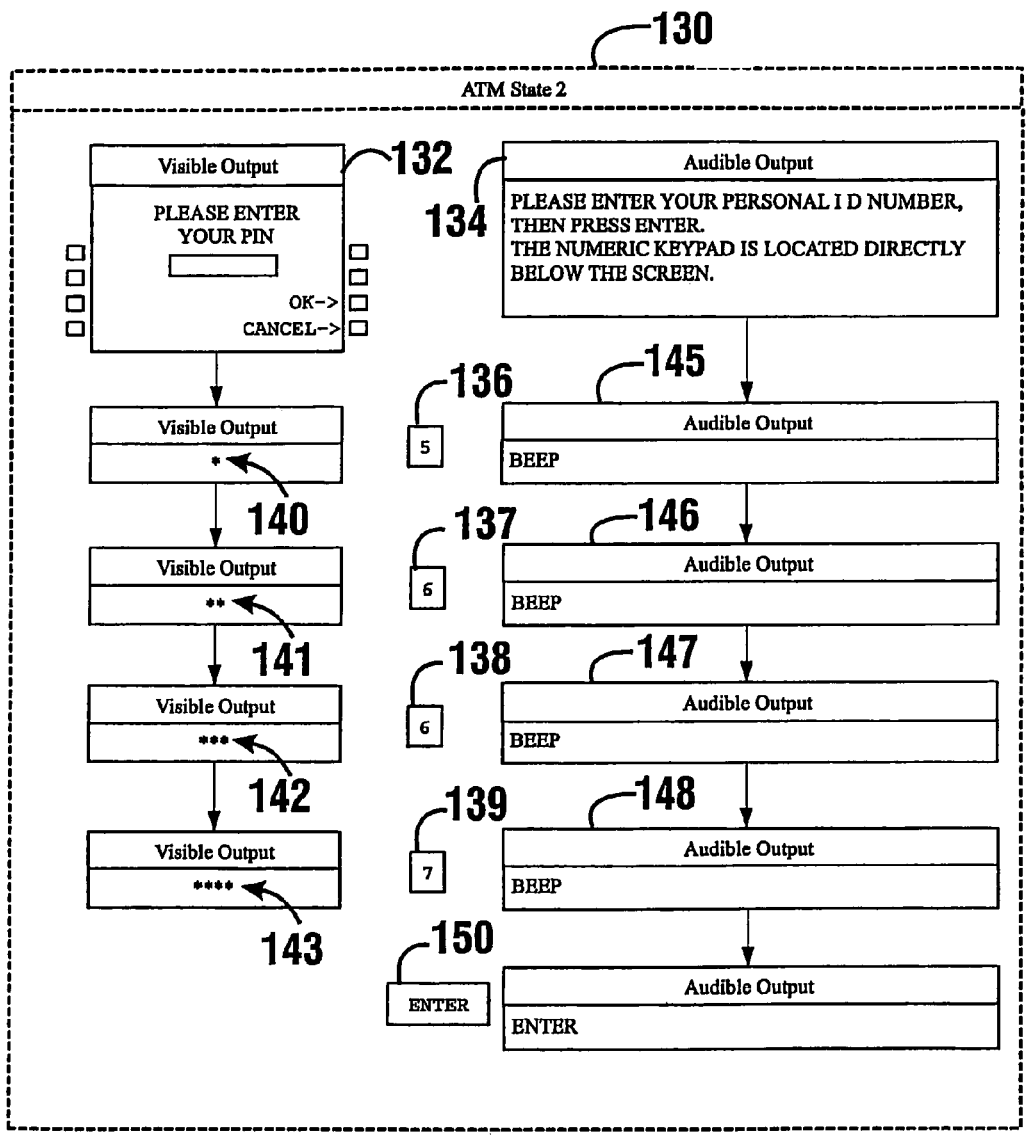

As shown in FIG. 4, the exemplary embodiment of the ATM may be operative to change to a second state 130, after the consumer successfully swipes and/or inserts a card using the card reader of the ATM. In this second state 130, the ATM may be operative to accept the input of a Personal Identification Number (PIN). The visible output 132 and/or the audible output 134 produced when the ATM is in this state, may request that the consumer enter a PIN. As a consumer presses each of the numeric keys 136-139 of the keypad which correspond to the consumer's PIN, the exemplary embodiment of the ATM may be operative to visually and/or audibly acknowledge each input. For example, the visible output 132 may be updated with each key press to display an additional asterisk symbol 140-143. In addition, with each key press the ATM may be operative to produce additional audible outputs 145-148 which may include a beep, or other sound acknowledging each input. When the user presses the enter key 150, the exemplary embodiment of the ATM is operative to produce a further audible output which includes a verbal description representative of the enter key such as for example the word "ENTER."

In an alternative exemplary embodiment, upon the detection of the connection of the headphones or other external device to the external port, the computer of the ATM may be operative to cause all or portions of the visible outputs typically provided through the display device of the ATM for a particular state of the ATM to be hidden from view. Hiding the visible outputs is operative to increase the privacy of the visually impaired person using the ATM and prevent a person standing near the ATM from spying on the transaction being performed at the ATM by the visually impaired person.

In exemplary embodiments the computer may be operative to keep the entire screen blank while the headphones remain connected to the external port of the ATM. In other exemplary embodiments, portions of the display screen may continue to display non-confidential information while private information associated with a transaction and/or the operation of the machine is only provided verbally through the headphones rather than being displayed on the display screen.

Examples of private information that is not shown through the display screen may include inputted numbers associated with an amount of cash to withdrawal or the value of an item being deposited such as a check. Other examples of private information not shown through the display device may include an account balance or any other transaction information that an ATM is capable of displaying. Further other types of information not shown through the display device may include information which shows the current state of the ATM, such as whether the ATM is being used to withdrawal cash or deposit an item.

Upon detection of the headphones or other external device being disconnected from the external port, the computer of the ATM may be operative to redisplay the visible outputs through the display device of the ATM which correspond to the current state of the ATM.

In exemplary embodiments where the display screen is not completely made blank while headphones are connected, the ATM may be operation to display a visual message, advertisement, or other non-confidential information. For example a visual message may be displayed which states that the current visible output may be redisplayed by removing the headphones and/or by providing a specified input. For example, if the person using the ATM has at least some vision ability, the person may prefer to both view visible outputs related to the transaction through the display screen of the ATM and listen to the verbal instructions related to the transaction through headphones. In this embodiment, the computer of the ATM may be responsive to the detection of a specified input through one of the input devices of the ATM to cause the visual outputs for the current state of the ATM to be redisplayed while continuing to output verbal instructions to the headphones.

Figure 5:
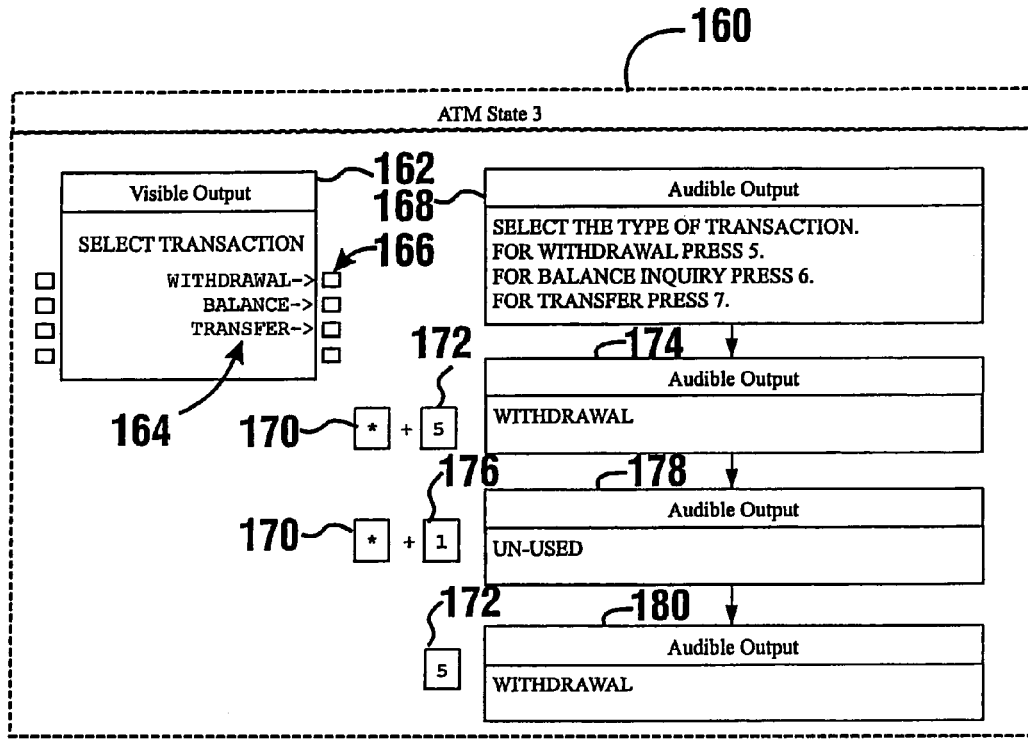

Referring to FIG. 4, once the consumer inputs a PIN and presses the enter key 150 of the keypad, the exemplary embodiment of the ATM may be operative to change to a third state in which the ATM is operative to enable the consumer to select one of a plurality of transaction functions to be performed with the ATM. As shown in FIG. 5, when the ATM is in a third state 160 the ATM may produce a visible output 162 which lists the transaction functions 164 and visually points to the function keys 166 that are operative to select each transaction function.

In the exemplary embodiment of the ATM, this described third state may cause the computer in the ATM to produce audible outputs 168 which describe which keys of the keypad are operative to select certain transaction functions. For example, in this described embodiment it may be indicated that the five "5" key may be actuated to select a withdrawal, the six "6" key may be actuated to select a balance inquiry, and the seven key "7" may be actuated to select a transfer.

In the exemplary embodiment, the ATM may be operative to provide a consumer with help to learn which keys perform which functions. For example, if the consumer wishes to verify that the five "5" key corresponds to a withdrawal transaction function without actually selecting a withdrawal transaction function, the consumer may press the star "*" key of the keypad prior to pressing the five "5" key. In this described exemplary embodiment the star "*" key may indicate to the ATM that the next following key is to be verbally described or named. As shown in FIG. 5, when the consumer presses the star "*" key 170 followed by the five "5" key 172, the ATM may be operative to produce a further audible output 174 which verbally indicates the name of the function such as "Withdrawal." When a help key such as the star "*" key 170 is actuated in this embodiment, the ATM may only describe the function associated with the next key press rather than changing to a further state corresponding to such a key press.

If the consumer presses the star "*" key 170 followed by a key that is not associated with a function in the current state, such as the one "1" key 176, the exemplary embodiment of the ATM may be operative to produce a further audible output 178. The further audible output may verbally indicate that the key is not being used in the current state of the ATM with an expression such as "Un-used."

In an exemplary embodiment, the second key for which the user wishes to receive an indication of the function must be pressed within a predetermined time period after the star "*" key 170 is pressed. Such a time period may for example be ten seconds. Of course, these approaches are exemplary and in other embodiments other approaches may be used.

Figure 6:
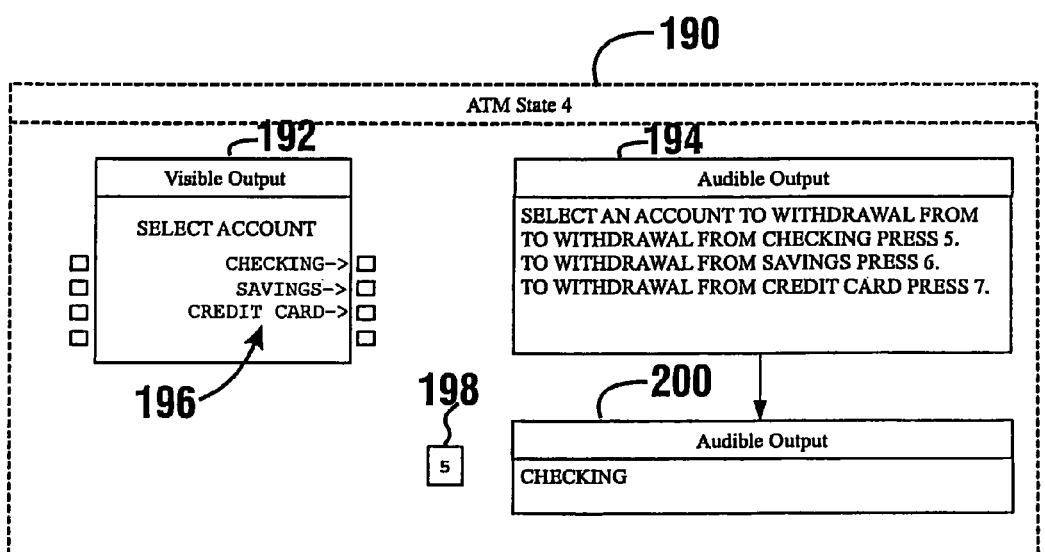

In the exemplary embodiment, when a consumer selects a transaction by pressing a key associated with the transaction, such as the five "5" key 172 without pressing the star "*" key 170, the ATM may be operative to change to a fourth state and produce another audible output 180 which verbally indicates to the user the name of the selected function. As shown in FIG. 6, the fourth state 190 may include a visual and/or an audible request that the consumer select or input additional information associated with the performance of the selected transaction function. With a withdrawal transaction, the fourth state may include a visible output 192 which lists the type of accounts 196 that the consumer may select for purposes of making the withdrawal. An audible output 194 may likewise verbally output a list of the types of accounts along with a corresponding key of the keypad to press for selecting each account. As discussed previously, when the consumer selects a key, the exemplary embodiment of the ATM may be operative to produce a further audible output 200, which verbally describes what the consumer has selected. For example, if the consumer presses the five "5" key 198, the audible output 200 may indicate the name of the selection by outputting a word such as "Checking."

Figure 7:
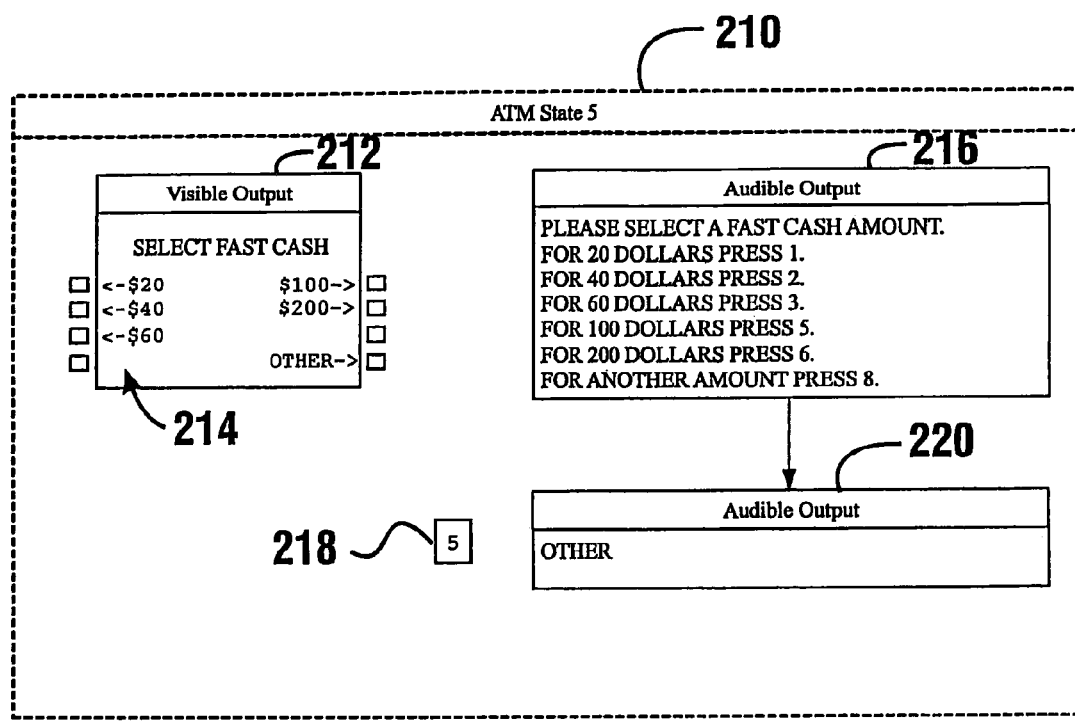

For a withdrawal transaction function, the exemplary embodiment may change to a further state after a selection of an account has been made. FIG. 7 shows an example of a fifth state 210, in which the ATM may be operative to accept the selection of an amount of cash to be withdrawn. Here, the ATM may be operative to produce a visible output 212 which lists a plurality of currency amounts 214 which may be selected. Likewise, the ATM may be operative to produce an audible output 216 which verbally indicates which keys of the keypad to press in order to select a particular currency amount.

Figure 8:
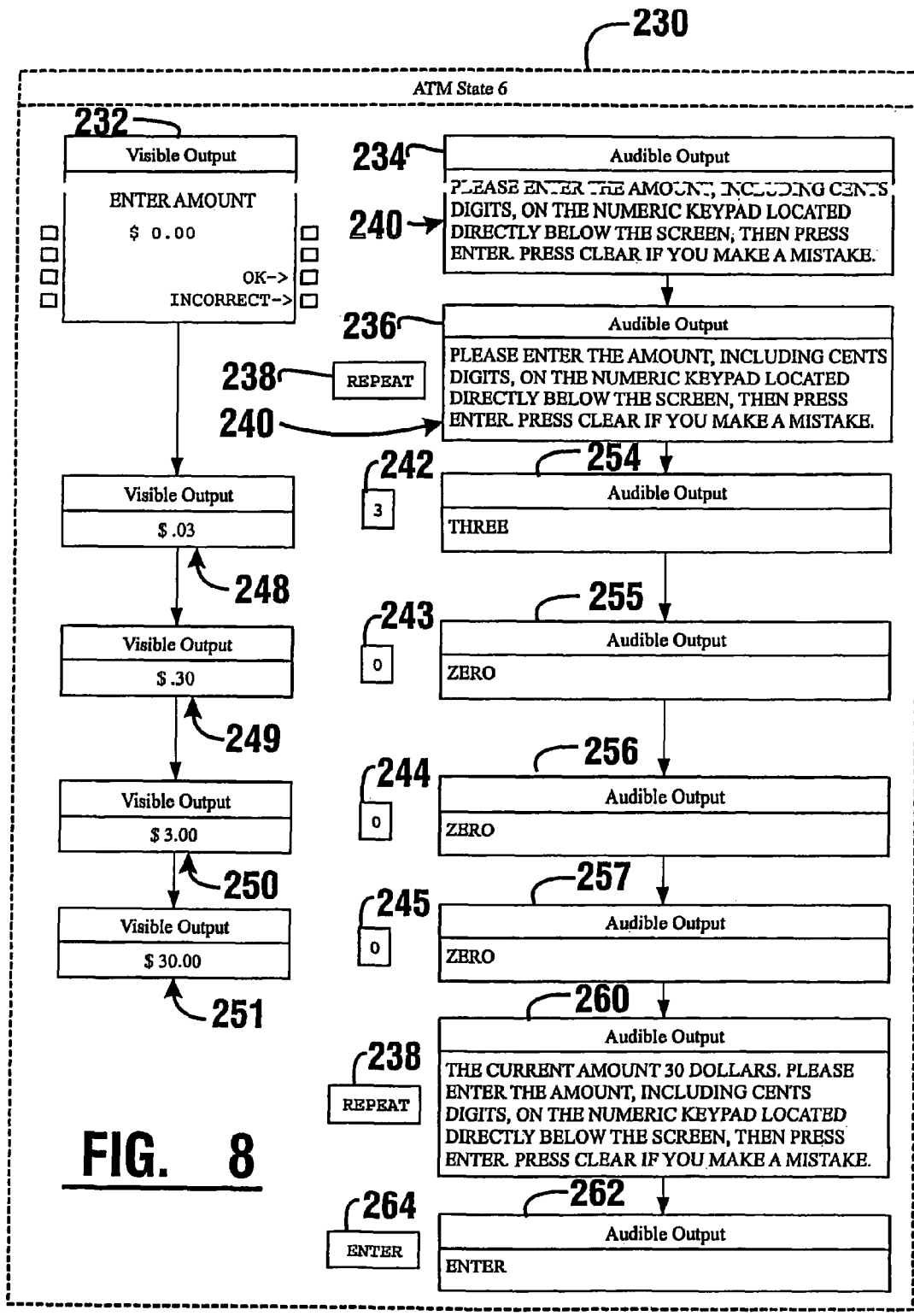

In this described exemplary embodiment, the five "5" key 218 corresponds to the selection of another amount for a withdrawal. When this key is pressed, while the ATM is in the fifth state, the ATM is operative to cause the ATM to change to a sixth state and is operative to produce a further audible output 220 which verbally describes this selection with a word such as "Other." As shown in FIG. 8, when the exemplary embodiment of the ATM is in a sixth state 230, the ATM may be operative to enable the consumer to enter a specific amount of cash to withdraw, which amount may be other than one of the predetermined amounts previously presented. Here, the ATM may be operative to produce a visible output 232 which requests that the consumer enter an amount for the withdrawal in a currency such as dollars. The exemplary embodiment of the ATM may further be operative to produce an audible output 234 which verbally requests that the consumer enter an amount which includes a fractional currency portion such as cents on the keypad.

If for some reason the consumer did not hear or understand all of the verbal instructions 240 of the audible output 234, the exemplary embodiment of the ATM may be operative to enable the consumer to cause the ATM to repeat the verbal instructions 240. In an exemplary embodiment, the ATM may be operative to produce a further audible output 236 which includes a repeat of the verbal instructions 240 responsive to the consumer pressing a repeat key 238 of the keypad. If the repeat key is pressed before the verbal instructions 240 in the audible output 234 have been completely outputted, the exemplary embodiment of the ATM may be operative to interrupt the audible output 234 and immediately begin outputting the further audible output 236. The further audible output 236 may then repeat the verbal instructions 240 from the beginning. In other exemplary embodiments, the ATM may be operative to produce further audible outputs 236 which include a repeat of the verbal instructions 240 responsive to actuation of any un-used key of the keypad which is not associated with another function or a selection available in the current state of the ATM.

When the consumer enters an amount of a withdrawal by pressing the number keys 242-245, the exemplary embodiment of the ATM may be operative to update the visible output 232 to produce visible outputs 248-251 with indicia representative of the current amount entered. Also, the ATM may be operative to produce further audible outputs 254-257 which verbally describe the number associated with the key that was pressed. In the exemplary embodiment, as each key is pressed, the ATM may be operative to determine a new current amount of value. The last two keys pressed may correspond to the fractional portion of the amount such as the cents portion in U.S. currency. The current amount may be stored in a memory or buffer in operative connection with the computer of the ATM. Pressing the repeat key 238 while a withdrawal amount has been or is being entered, may cause the ATM to produce a further audible output 260 which verbally indicates the current amount stored in the memory of the ATM. In an exemplary embodiment, the audible output 260 may also include a repeat of the verbal instructions 240.

Figure 9:
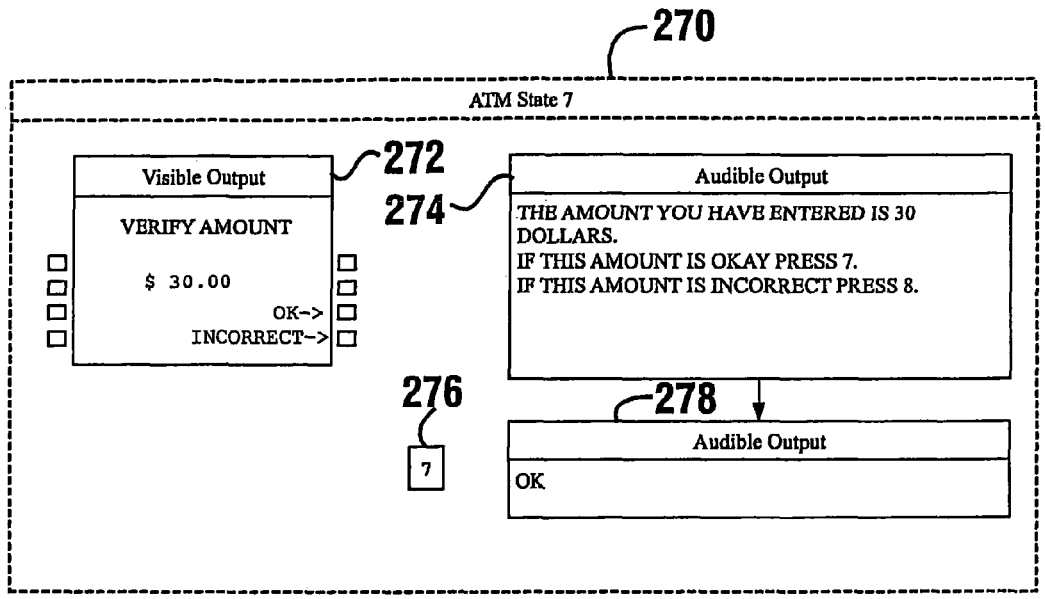

When the consumer has completed entering an amount, the consumer may press the enter key 264. Pressing the enter key may cause the ATM to change to a seventh state and produce another audible output 262 which verbally describes that the enter key has been pressed. FIG. 9 represents the ATM in a seventh state 270. Here, the exemplary embodiment of the ATM may be operative to produce a visible output 272 which requests that the consumer verify that the amount entered in the preceding state is correct. The ATM may also be operative to produce an audible output 274 which verbally indicates the current amount entered and requests that the consumer press keys of the keypad to verify that the amount is either correct or incorrect. In this described exemplary embodiment, the consumer may verify the amount by pressing the seven "7" key 276 of the keypad. When the seven "6" key is pressed, the ATM may be operative to produce an audible output 278 that verbally indicates a description of the selection by outputting a word such as "OK."

Figure 10:
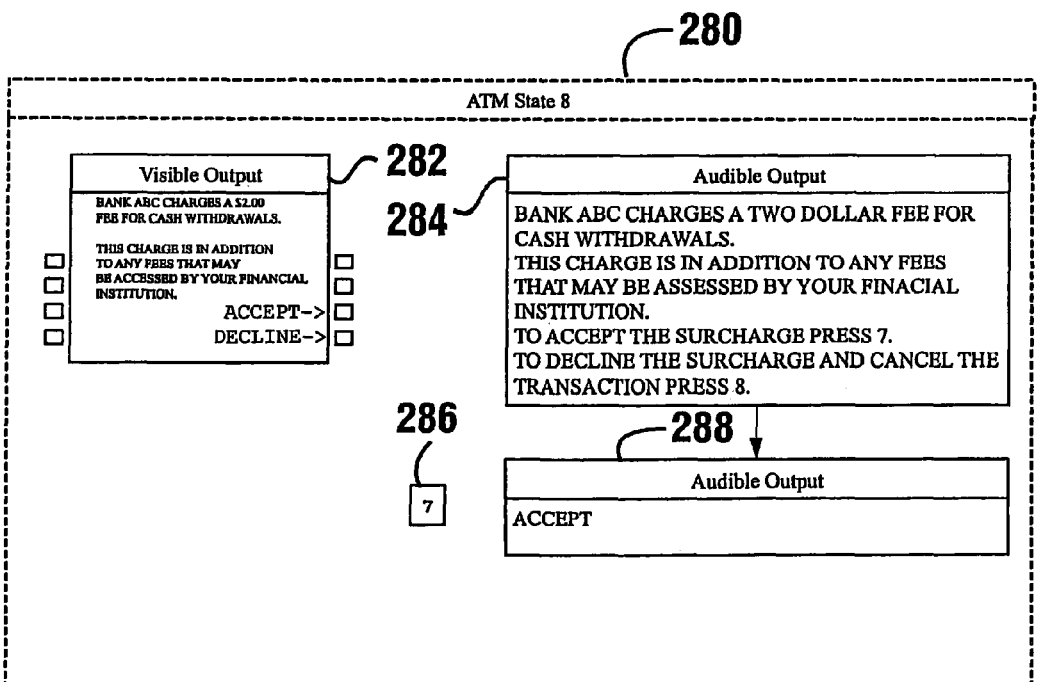

Once an amount has been verified by the consumer, if the ATM is configured to charge a surcharge for the transaction, the ATM may change to a further state such as the eighth state 280 shown in FIG. 10. Here, the exemplary embodiment of the ATM may be operative to produce a visible output 282 which discloses the fee for the withdrawal and requests that the user accept or decline the surcharge. The ATM may further be operative to produce an audible output 284 which verbally describes the fee and indicates which keys of the keypad may be pressed in order to accept or decline the surcharge.

Figure 11:
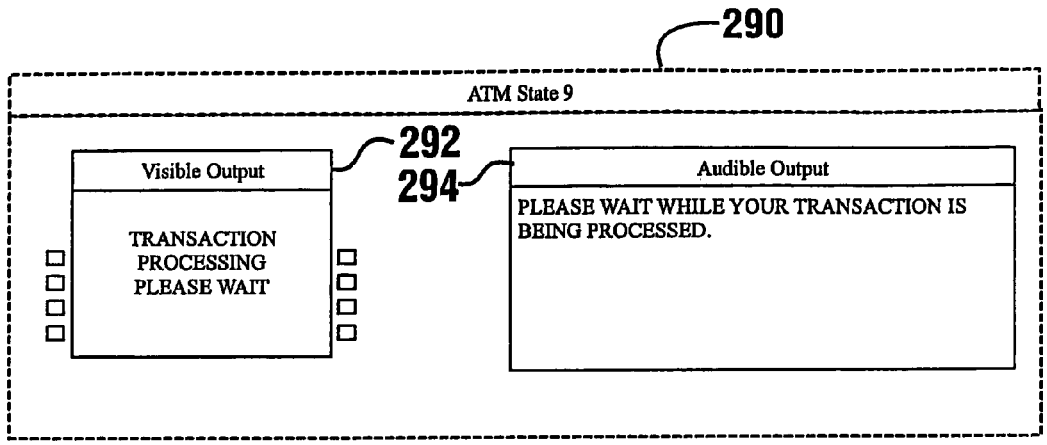
Figure 12:
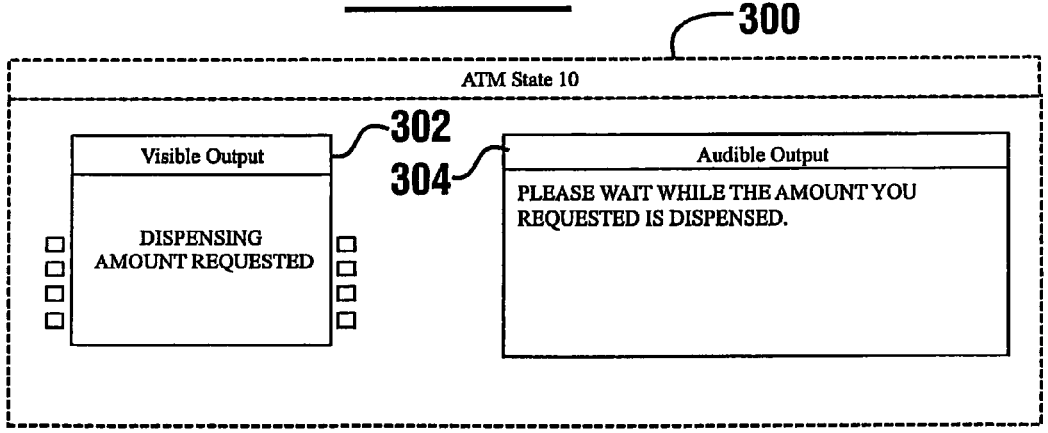

If the consumer accepts the charge by pressing the seven "7" key 286 for example, the ATM may be operative to produce the further audible output 288 which verbally indicates that the user has accepted the surcharge by outputting a word such as "Accept." Once a consumer has accepted the surcharge (if applicable for the transaction), the exemplary embodiment of the ATM may be operative to change to a ninth state 290 represented in FIG. 11 in which the ATM produces a visible output 292 and/or an audible output 294 which indicates that the transaction is being processed. Once the withdrawal has been authorized, the ATM may be operative to change to a tenth state 300 represented in FIG. 12. In this state the exemplary embodiment of the ATM may produce a visible output 302 and/or an audible output 304 which indicate that the ATM is in the process of dispensing the requested amount.

Figure 13:
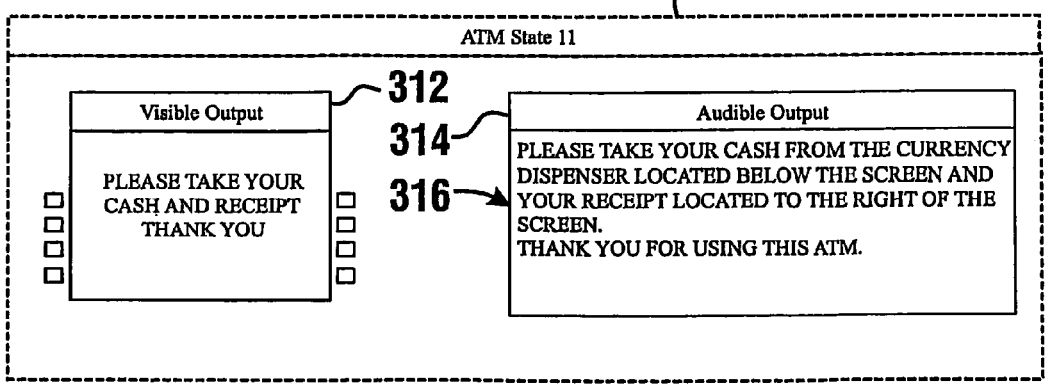

Once the exemplary embodiment of the ATM has dispensed an amount of cash with the cash dispenser that corresponds to the requested amount, the ATM may be operative to change to an eleventh state 310 as represented in FIG. 13. In the eleventh state the ATM may be operative to produce a visible output 312 and/or an audible output 314 which indicate that the consumer may take the dispensed amount of cash and a receipt from the ATM. In addition, the verbal instructions 316 of the audible output may further describe the locations of the opening through which cash is delivered and the opening through which a receipt is delivered on the ATM.

Once the transaction function has been completed, the exemplary embodiment of the ATM may return to a previous state such as the described third state 160 shown in FIG. 5 for selecting another transaction or the described first state 102 shown in FIG. 3 for attracting new consumers. It is to be understood that the described ATM states, visible outputs, and audible outputs are examples of performing only one type of transaction with the exemplary embodiment. Other transaction functions for the described ATM and alternative exemplary embodiments of the ATM may have additional and/or other types of ATM states, visible outputs, and audible outputs.

In some exemplary embodiments, pre-existing ATMs which do not offer a user interface for the visually impaired may be upgraded to include some or all of the previously described features. Such an upgrade may include installing new terminal control software that is operative to cause the computer to direct the previously described audible outputs through a sound system device of the ATM. Such upgraded terminal control software may further be operative to cause the ATM to repeat verbal instructions, provide verbal help for selections, and/or change the volume of the audible output as described previously.

Figure 14:
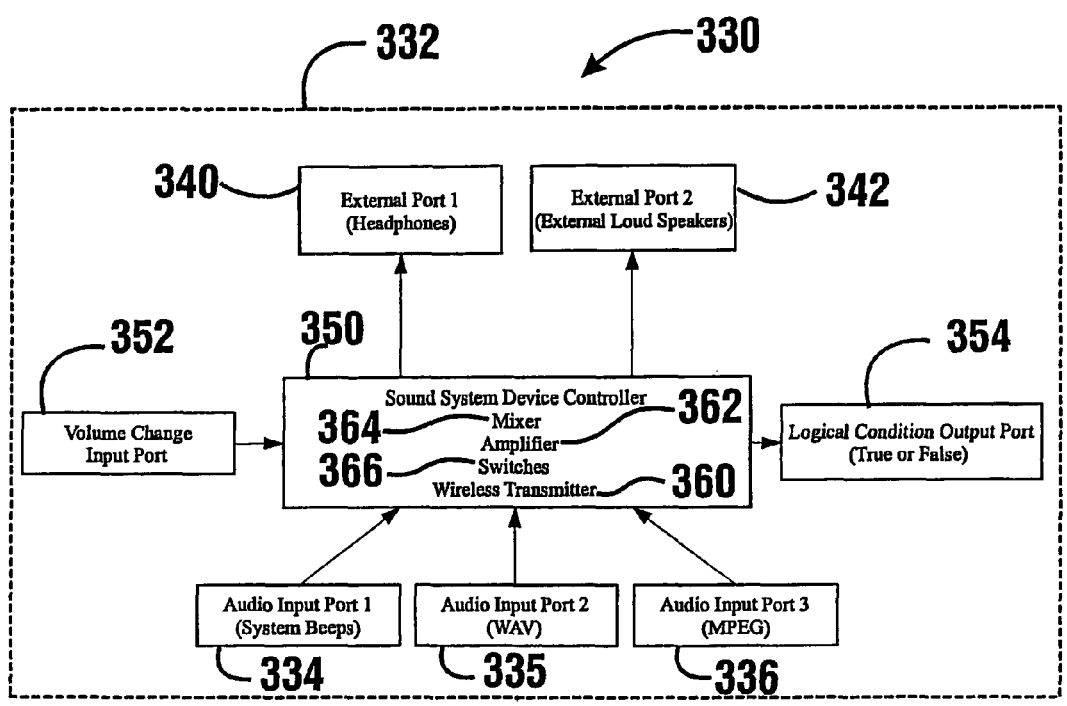
FIG. 14 is a schematic view representative of an exemplary audio system.

In addition, such an upgrade of a pre-existing ATM may include the installation of an audio system that is operative to further enable an ATM to have some or all of the previously described features. FIG. 14 shows an example of an audio system 330 which is adapted to provide an ATM with support for headphones 340 using an exemplary embodiment of a sound system device 332. The sound system device 332 may be adapted to accept one or more audio signals through audio input ports 334-336. Such input ports may be connected to the output ports of one or more audio output devices of the ATM. For example, such audio output devices of an ATM may include a sound card that is operative responsive to operation of the computer associated with the ATM to produce sound signals from WAV or MP3 files. In addition, the ATM may include audio output devices for generating audio signals with beeps and other prompting sounds to assist a consumer in operating the ATM. Also, the exemplary embodiment of the ATM may include a text-to-speech synthesizer audio output device and/or software which is operative to produce audio signals with verbal instructions responsive to alphanumeric text-based instructions included in visual display outputs.

The exemplary sound system device 332 may include a controller 350 that is operative to manipulate one or more audio signals individually through the audio input ports 334-336. The controller 350 may include an amplifier 362 and mixing circuits 364 which are operative to selectively amplify and mix the audio input signals together to produce one or more amplified audio signals. Such amplified audio signals may be selectively directed by the controller 350 through one or more of the external ports 340, 342 of the sound system device. In an exemplary embodiment, the external ports 340, 342 correspond to speaker ports that are adapted to releasably connect to headphones and external loudspeakers. In the exemplary embodiment, the sound system device 332 may include one or more selectable adjustable switches 366 such as jumpers, dip switches, or other electronic switches which can be configured to set relative amplification and other characteristics for mixing one or more audio signals received from the audio input ports 334-336.

In an exemplary embodiment of the sound system device 332, the controller may be in operative connection with a volume change input port 352. The volume change input port 352 may be operative to receive electrical signals responsive to the operation of one or more volume controls such as a momentary switch, key, button or other consumer accessible switch. The controller 350 may be configured to cycle through one of a plurality of volume levels responsive to the electrical signals received from the operation of the volume control. The controller 350 may be operative to amplify the amplified audio signals responsive to the currently selected volume level. When the volume level reaches a maximum level, the exemplary controller may be operative to change the volume level to a predetermined minimum level responsive to the next electrical signal received from operation of the volume control.

In this described exemplary embodiment, the ATM may include a volume control such as a button adjacent the keypad which is in operative connection with the volume change input port 352 of the sound system device 332. However, in other exemplary embodiments, the controller may be operative to receive volume changing signals from the computer of the ATM. Terminal control software may be configured to detect events such as the clicking of a pound "#" key of the keypad and cause the computer to output a volume changing signal to the sound system device.

As discussed previously, the sound system device may be operative to mute amplified audio signals being directed through the external port 342 for external loudspeakers, responsive to the sound system device detecting the connection of headphones to the external port 340 for headphones. In an exemplary embodiment the controller 350 may be operatively configured to detect the impedance change across the external port 340 when headphones are electrically connected to the external port. In the exemplary embodiment, when the connection is detected the controller 350 may be operative to switch off any amplified audio signals being directed to the external port 342 for the external loudspeakers.

In addition, upon detection of the connection of the headphones the controller 350 may be operative to change the volume level of the amplified audio signals being directed to the external port 340 for the headphones to a predetermined level selected from one of the plurality of volume levels produced by the sound system device. Such a predetermined level may be configured with a jumper, dip switch, or other selectable switch associated with the sound system device. The predetermined level for example may be set to a volume level that is loud enough to be capable of being heard by almost all consumers, but is sufficiently low to be unlikely to cause discomfort to the majority of consumers using headphones with an ATM.

In the exemplary embodiment, the controller may further be operative to detect when the headphone has been disconnected from the external port 340 for the headphones. When this occurs the controller may be operative to mute the amplified audio signals to the external port 340 for the headphone and institute the delivery of amplified audio signals to the external port 342 for external loudspeakers.

Also, in the exemplary embodiment, the controller 350 may be in operative connection with a logical condition output port 354 that is adapted to communicate with the computer. The controller 350 may be operative responsive to the detection of the headphones connected to the external port 340 for the headphones, to set the logical condition output port 354 to an electrical condition representative of true or on. When the controller 350 detects that the headphones are no longer connected to the external port 340 for headphones, the controller may be operative to set the logical condition output port 354 to an electrical condition representative of false or off.

In the exemplary embodiment, the computer of the ATM may be configured to poll or monitor the condition of the logical condition output port 354. The terminal control software may be configured to turn on or off audible outputs being directed to the audio input ports 334-336 of the sound system responsive to the current condition of the logical condition output port 354. Thus for example, when the headphones are not attached, the exemplary embodiment of the ATM may be configured to output system beeps and other prompting sounds through the external loudspeakers. However, when headphones are connected and the condition of the logical condition output port 354 changes to true or on, the exemplary terminal control software may be programmed to begin producing audio output with verbal instructions for operating the machine which is directed to the headphones.

In further alternative exemplary embodiments, the sound system device may further include a wireless transmitter 360. Such a transmitter may be operatively configured to transmit a wireless audio signal through an external port of the sound system device. Such a wireless audio signal may be received by a wireless receiver of the consumer such as wireless headphones or other suitable external device usable by the consumer for receiving outputs from the ATM.

In alternative embodiments, the wireless audio signal may be encrypted by the ATM to minimize possible eavesdropping on the transaction by a third party. Such encryption may include a handshaking protocol between the ATM and the headphones or other wireless receiver device of the consumer which verifies that the consumer currently accessing the ATM is the only party that can decipher the audio signals in the wireless transmission from the ATM. For example, in one exemplary embodiment, wireless audio signals between the headphones and the ATM may be transmitted using wireless network technology such as BlueTooth or IEEE 802.11. In such embodiments, the ATM may output to each consumer within range of the ATM a verbal message which includes a unique session code. When the consumer has access to the machine, the consumer can enter their unique access code before entering a PIN. Based on the unique access code entered, the ATM may then direct the audio signals related to operating the ATM only to the set of wireless headphones which originally received the access code from the ATM.

In further exemplary embodiments, the ATM may be configured to direct private wireless audio signals to the headphones or other receiver device of the consumer based on information retrieved from the card or other input used to access the ATM by the consumer. For example, such information from or correlated with data on the card or other input may enable the ATM to retrieve or determine a private network address, encryption key, digital certificate, or other information associated with the headphones of the consumer, which may be used by the ATM to establish secure and private communications with head phones or other wireless devices of the consumer.

In further alternative exemplary embodiments, the handshaking protocol between the ATM and the wireless headphones or receiving device used by the consumer may be based on a biometric input received from the consumer currently accessing the ATM. Such biometric input for example may include a fingerprint scan, facial recognition system or other biometric scan of the consumer. The ATM may then selectively send private wireless audio signals only to that set of headphones which is operatively configured with information that corresponds to the biometric input corresponding to the particular user.

The exemplary embodiments of an audible user interface system and method have been described for use with an automated banking machine such as an ATM. However, it is to be understood that one or more of the features described related to providing an audible user interface may also be used in other self-service terminals such as voting machines and kiosks.

As discussed previously, exemplary embodiments of automated banking machines such as ATMs may output verbal instructions in response to alphanumeric text messages 54. Such ATMs may include a text-to-speech device 62 and/or text-to-speech software which is operative to convert the alphanumeric text messages 54 to verbal audible outputs. As discussed previously, such alphanumeric text messages 54 are also referred to herein as text-to-speech data.

The text-to-speech data may be stored in a local data store of the machine. For example, in one exemplary embodiment, text-to-speech data may be included in one or more files stored on a hard drive of the machine. One or more of the text-to-speech files may be associated with visual screen data 52 also stored on the machine for use with generating visible outputs through the display device of the machine. In exemplary embodiments, screen data 52 may specify which text-to-speech files to access for use with generating audible outputs during the display of the visible outputs.

In exemplary embodiments, the text-to-speech data may be transferred to the machine from a remote server such as a host banking system. Although, in exemplary embodiments, host banking system software may be updated to accommodate the transfer of text-to-speech data to ATMs, alternative exemplary embodiments may include a new method of using existing or legacy host banking systems to transfer text-to-speech data to an ATM. Such a method may include providing monitoring software on the ATM which is capable of detecting and retrieving text-to-speech data from legacy messages originally designed for other types of ATM configuration data.

For example, legacy ATM protocols such as Diebold 91x may include messages which are operative to transfer screen data to ATMs from a host banking system. Such legacy protocols for transferring screen data may include attributes which are associated with or are used to label the screen data being transferred using the protocol. Examples of such attributes associated with screen data messages may include a screen name/number and a bank number.

An exemplary embodiment of the described monitoring software may be operative to monitor one or more of such attributes in the screen data messages. Screen data messages which include text-to-speech data may include predefined values for one or more of these attributes which the monitoring software is operative to recognize as indicating that the screen data message includes text-to-speech data. When such predefined attributes are detected the monitoring software is operative to read the text-to-speech data from the screen data messages and store the text-to-speech data on the machine.

In an exemplary embodiment the attributes used to indicate the presence of text-to-speech data in the screen data messages may also be used to specify, label, or describe features of the text-to-speech data. For example the attributes may be used to identify the human language associated with the text-to-speech data (e.g., English or Spanish). Such attributes may also provide information usable by the monitoring software to label or name the text-to-speech data.

For example, the following data may be included in a screen data message sent to an automated banking machine from a host banking system:

015 900 [E]_000 Please select your transaction. For a withdrawal press 1. To make a deposit, press 2. To transfer money, press 3

An exemplary embodiment of the monitoring software may be operative to monitor the attribute associated with the bank number for values which indicate that the screen data message includes text-to-speech data. In this described exemplary embodiment, bank numbers greater than or equal to 900 are used to specify that text-to-speech data is present in the message. When bank numbers greater than or equal to 900 are detected by the monitoring software, the monitoring software may be operative to use the information provided in the screen data message to generate a text-to-speech file.

In an exemplary embodiment, the text-to-speech file generated may be placed in a predetermined and/or configurable directory on the machine. In other exemplary embodiments, the text-to-speech file may be placed in a directory specified by the screen data in the message. For example, in an exemplary embodiment the bank number may be used to specify a name of a directory on the hard drive of the machine to store the text-to-speech file. Each directory may correspond to a different human language, so that all text-to-speech files stored in a particular directory correspond to the same human language.

In the above example, the screen data message includes the bank number of 900. In exemplary embodiments, a bank number with a value of 900 may correspond to a human language such as English. Also, in such exemplary embodiments, a bank number with a value of 901 may correspond to another human language such as Spanish.

When the screen data is associated with the bank number with the value of 900, the monitoring software may be operative to generate and store a corresponding text-to-speech file in a directory reserved for English language text-to-speech files. Whereas, when the screen data is associated with the bank number with the value of 901, the monitoring software may be operative to generate and store a corresponding text-to-speech file in a directory reserved for Spanish language text-to-speech files.

In one exemplary embodiment, text-to-speech directories may include names which correspond to all or portions of the bank number or other attribute which are used to specify the human language of the text-to-speech data. For example, text-to-speech files may be placed in a directory with a name that corresponds to one or more of the digits of its associated bank number. Thus text-to-speech files associated with the bank number of 900 may be placed in a directory with a name such as "lang000," while text-to-speech files associated with the bank number of 901 may be placed in a directory with a name such as "lang001." Likewise, text-to-speech files associated with the bank number of 902 may be placed in a directory with a name such as "lang002." In this described exemplary embodiment, one or more of the digits or other characters which distinguish between the different bank numbers or other attributes may be used in the name of corresponding directories used to store the text-to-speech files.

In exemplary embodiments, other data or attributes associated with the screen data message may be used by the monitoring software to generate a name for the generated text-to-speech file. For example, in the above example, the screen data message includes a screen name attribute with a value of "015." This screen name may be included in the name of the generated text-to-speech file. Also, in the above example, the screen data following the bank number includes a letter "E" in brackets. The monitoring software may also be operative to identify the letter between the brackets following the bank number and use the identified letter in the name of the file.

As a result, the corresponding file name generated by the monitoring software from the above example of a screen data message may include the characters "E015." In exemplary embodiments, the monitoring software may include other characters in the file names such as a descriptive pre-fix and extensions. In one exemplary embodiment, generated text-to-speech files include a prefix such as "TT" and an extension such as "htm." For the above example of screen data, the corresponding text-to-speech file name would be "TTE015.htm."

In exemplary embodiments, the monitoring software may be operative to generate text-to-speech files which include HTML tags, Java script, VB script, XML, and/or other code which is operative to cause the ATM to generate audible outputs responsive to the text-to-speech data stored in the file. For example, in the above example, the screen data following the brackets may correspond to text-to-speech data. The monitoring software may be operative to place this text-to speech data in an HTM file along with HTM tags, Java script and/or other interpreted code which is operative to cause the ATM to process the text-to-speech data with text-to-speech devices 62 and/or software on the machine.

In one exemplary embodiment, the HTM text-to-speech file may reference an Active X control or other external software. The ATM may include a browser or other HTML responsive software which is operative to read the HTM text-to-speech file and in response to the file access and/or send the screen data as an argument to an ActiveX control. The ActiveX control may be programmed to accesses and/or cause the text-to-speech device or software of the ATM to convert the text-to-speech data to corresponding audible outputs.

In the above example, the text-to-speech device and/or software would output verbal instructions representative of the spoken command "Please select your transaction. For a withdrawal press 1. To make a deposit, press 2, To transfer money, press 3."

In an exemplary embodiment, the text-to-speech data may include additional attributes which are not intended to be spoken but are intended to configure the operation of the text-to-speech device and/or software. In the above example, the screen data begins with the four characters "_000." The text-to-speech device and/or software may be responsive to these characters to determine which human language to use when generating verbal instructions from the text-to-speech data. For example, the beginning characters "_000" may correspond to the human language English. As a result, the text-to-speech device and/or software may convert the subsequent text-to-speech data to audible outputs which correspond to an English pronunciation of the text-to-speech data.

In the exemplary embodiment, the terminal control software of the machine may be operative to access the text-to-speech files responsive to screen data files. Thus, when the ATM produces a visible output responsive to a particular screen data file, the screen file may reference an associated text-to-speech file which describes the features of the visible output.

With the above described exemplary embodiment, both visual screen data and associated text-to-speech data can be updated on an ATM using standard or legacy ATM protocols and messages from a host banking system. In addition, for each state of an ATM, screen data and associated text-to-speech data may be downloaded to the PC in multiple languages. Depending on the language preference of the user operating the machine, terminal control software in the ATM is operative to access the screen data and text-to-speech data which corresponds to the language preferred by the user.

In further exemplary embodiments, the monitoring software may be operative to monitor screen messages for the presence of screen data and responsive thereto, saving the screen data in an ASCII text format or other format in a single display screen file on the hard drive of the ATM.

Further, the monitoring software may be operative to monitor for the presence of state messages from a host banking system. The monitoring software may be operative responsive to the detection of a state message to retrieve state information from the messages and store the state information in a single state file.

In further exemplary embodiments, the monitoring software may be operative to store screen data that comes from a host banking machine in an OAR message or as part of a screen update data field in a function command message.

In exemplary embodiments, HTML code accessible to the ATM for generating user interfaces for operating the ATM may include the use of the "^" symbol or other symbol or tag which causes an HTML responsive program (such as a browser) to access one of the described text-to-speech, display screen, or state files generated by the monitoring software.

For example HTML code for generating a user interface may include the command ^0154. The "^" symbol may be detected by the browser accessing the HTML code and in response thereto the browser may access a text-to-speech file such as "TTS154.TXT" from the appropriate language director such as lang000. The text-to-speech file "TTS154.TXT" may have been created by the monitoring software responsive to a screen message as discussed previously. In another example, the "^" or other symbol or tag may reference a display screen file generated using the monitoring software such as the display screen file "SCR035.txt." The data from the display screen file may be incorporated into a visual display screen generated by the ATM. By referencing such text-to-speech, visual display screen, or state files from HTML code, the ATM can be dynamical updated to display visual or output audible information representative of different surcharge amounts, or low bill denominations without having to alter the programming of the host system software.

A further exemplary embodiment may include a sound configuration software component which is operative to aid a technician with the process of configuring an ATM to provide audible outputs with verbal instruction. In one exemplary embodiment, the sound configuration software may be located on a portable medium such as a CD/DVD disk or other storage medium. The portable medium may be placed in a corresponding reading device of the ATM (e.g., CD/DVD reader) and the sound configuration software may be executed from the portable medium.

In an exemplary embodiment, the sound configuration software may be operative to configure and/or update an ATM to include sound software and/or data necessary to enable the ATM to generate audible outputs with verbal instructions. Such sound software may include text-to-speech synthesizer software, the previously described monitoring software, and/or any other sound system related software or data.

The sound configuration software may also be operative to copy from the portable medium verbal instruction data (e.g., text-to-speech files, WAV files, and/or MP3 files) which corresponds to display screens provided by the ATM which are not typically retrieved from a host. For example, ATMs may include an off-line screen if the ATM is powered on without having a communication connection with a host banking system. ATMs may also include an out of service screen if they have communication with the host established but have not received screen messages from the host. ATMs may also include screens to handle situations where a transaction will require a particular device which is currently being serviced or where the device requires interaction with the user. For these described screens, the sound configuration software may be operative to copy from the portable medium verbal instruction data to the ATM which is operative to cause the ATM to generate audible outputs which verbally describe these screens.

In addition, manufacturers of ATMs often produce many different models of ATM with different physical shapes and sizes. Different models may have the display screen, keypad, cash dispenser, and other devices positioned in different locations with respect to each other. Further, even for the same model of ATMs, the positions of some devices may be located in a plurality of different positions depending on the preferences of the owner and/or operator of the ATM.

Because the audible outputs from the ATM may include verbal instructions which describe the location of the devices on the ATM, different ATMs may require verbal instruction data which is customized to the physical configuration of the ATM.

In this described exemplary embodiment, the sound configuration software may cause the computer of the ATM to output a tutorial which prompts the technician to input information representative of what devices are installed on the ATM and/or where on the ATM the devices are located. For example, not all ATMs include a depository mechanism or coin dispenser. Thus, an exemplary embodiment of the sound configuration software may query the technician to determine whether a depository mechanism or coin dispenser is present. If a depository mechanism is determined by the configuration software to be present, the sound configuration software may further query the technician to determine the location of the depositary mechanism relative a fixed point such as the screen or other landmark on the ATM.

In exemplary embodiments, the sound configuration software may further query the technician as to the type of devices installed on the ATM. For example, ATMs may include different types of card readers such as an insert reader, swipe reader, vertical DIP reader, or horizontal DIP reader. An exemplary embodiment of the sound configuration software may be operative to prompt the technician to select which type of card reader is installed.

Based on the answers provided by the technician, the sound configuration software may copy data files from the portable medium to the hard drive of the ATM which are operative to correctly configure the ATM to provide audible outputs customized to the physical configuration of the ATM. As a result, after the sound configuration software has configured the ATM, the ATM may be operative to provide audible outputs with verbal instructions which accurately describe the locations of devices (e.g., "to the right of the monitor") and their method of use (e.g., "insert card" or "swipe card vertically").

In an exemplary embodiment, the answers provided by the technician associated with the location and/or type of devices installed on the ATM may be stored in a data store on the ATM. A tutorial included with the sound configuration software may present configuration options for the sound software being configured responsive to the data in this data store. In exemplary embodiments, this data store may remain on the hard drive of the ATM. Thus the next time the sound configuration software is executed from the portable medium, the tutorial may proceed using the data provided by the technician previously rather than forcing the technician to re-answer each question regarding the location and/or type of devices on the ATM. However, exemplary embodiments of the sound configuration software may also enable the technician to update the data stored in the data store as needed.

In further exemplary embodiments, the portable medium may be customized for different customers of the manufacturer of the ATMs. For example, a customer may have a relatively small set of combinations of ATM models and associated devices. For this customer, a custom portable medium may be created which includes sound configuration software which prompts the user with questions specific to the range of ATM models and associated devices the customer is expected to have. Thus, if the customer only has insert type card readers, the sound configuration software on the customer specific portable medium may be operative to not prompt the technician as to the type of card reader installed on the ATM. Further, the customer specific portable medium may include audible output data which generates audible outputs specific to the customer. For example, a text-to-speech file associated with a welcome screen of the ATM may include the name of the customer (e.g., "Welcome to Bank XYZ").

Thus, the new automated banking machine audible user interface system and method of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method carried out in connection with automated banking machines that operate responsive to data read from data bearing records, comprising:
  a) through operation of at least one computer in an automated banking machine host banking system, sending at least one screen message to an automated banking machine that includes a card reader, wherein the at least one screen message includes speech data and data indicating the presence of the speech data in the at least one screen message, wherein the speech data is usable by the automated banking machine to produce an output of verbal information through at least one speaker device of the automated banking machine, wherein the data indicating the presence of the speech data in the at least one screen message, is usable by the automated banking machine to determine that speech data in the screen message is available to be retrieved from the screen message,
  b) through operation of the at least one computer of the host banking system, sending at least one further message to the automated banking machine, wherein the at least one further message does not include speech data, wherein the at least one further message does not include data indicating the presence of speech data in the at least one further message, wherein the at least one further message is operative to cause the automated banking machine to output visual information corresponding to the at least one screen message through at least one display device of the automated banking machine and to cause the automated banking machine to output through the at least one speaker device verbal information corresponding to the output visual information.

2. The method according to claim 1, wherein in (b) the visible information includes visible instructions for operating the automated banking machine, wherein in (a) the verbal information includes verbal instructions for operating the automated banking machine.

3. The method according to claim 2, wherein the visible instructions and the verbal instructions prompt a user to provide at least one input associated with a transaction through at least one input device of the automated banking machine, further comprising:
  c) receiving with the host banking system from the automated banking machine, a communication associated with the transaction.

4. The method according to claim 3, wherein in (b) the visible instructions prompt a user to provide at least one input of an amount of value, wherein in (a) the verbal instructions prompt a user to provide the at least one input of the amount of value.

5. The method according to claim 4, wherein the automated banking machine includes a cash dispenser, and wherein in (c) the transaction includes dispensing through operation of the cash dispenser, an amount of cash that corresponds to the amount of value.

6. The method according to claim 4, wherein the automated banking machine includes a depository mechanism, and wherein in (c) the transaction includes receiving a deposit, through operation of the depository mechanism of the automated banking machine, of at least one item which is associated with the amount of value.

7. The method according to claim 6, wherein in (a) the at least one screen message includes data usable by the automated banking machine to store the at least one screen message and the speech data in correlated relation in at least one data store of the automated banking machine.

8. The method according to claim 1, wherein in (b) the visible information includes an amount of value, wherein in (b) the verbal information includes the amount of value.

9. The method according to claim 8, wherein the amount of value includes an account balance.

10. The method according to claim 1, wherein the data indicating the presence of speech data in (a) corresponds to a bank number that is at least as great as 900.

11. Computer readable media bearing computer executable instructions which are operative to cause at least one computer in an automated banking machine host banking system which operates in connection with automated banking machines that operate responsive to data read from data bearing records, to cause the host banking system to carry out a method comprising:
  a) through operation of the at least one computer in the host banking system, sending at least one screen message to an automated banking machine that includes a card reader, wherein the at least one screen message includes speech data and data indicating the presence of the speech data in the at least one screen message, wherein the speech data is usable by the automated banking machine to produce an output of verbal information through at least one speaker device of the automated banking machine, wherein the data indicating the presence of the speech data in the at least one screen message, is usable by the automated banking machine to determine that speech data in the screen message is available in the at least one screen message;
  b) through operation of the at least one computer of the host banking system, sending at least one further message to the automated banking machine, wherein the at least one further message does not include speech data, wherein the at least one further message does not include data indicating the presence of speech data in the at least one further message, wherein the at least one further message is operative to cause the automated banking machine to output visual information corresponding to the at least one screen message through at least one display device of the automated banking machine and to cause the automated banking machine to output through the at least one speaker device verbal information corresponding to the output visual information.

* * * * *